United States Patent
Quillen et al.

(10) Patent No.: US 10,803,871 B2
(45) Date of Patent: *Oct. 13, 2020

(54) METHOD AND SYSTEM FOR HYBRID DECODING FOR ENHANCED END-USER PRIVACY AND LOW LATENCY

(71) Applicant: Nuance Communications, Inc., Burlington, MA (US)

(72) Inventors: Carl Benjamin Quillen, Brookline, MA (US); Naveen Parihar, Lexington, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,451

(22) Filed: Nov. 26, 2018

(65) Prior Publication Data

US 2019/0214014 A1 Jul. 11, 2019

Related U.S. Application Data

(63) Continuation of application No. PCT/US2017/034504, filed on May 25, 2017, which
(Continued)

(51) Int. Cl.
*G10L 15/30* (2013.01)
*G10L 15/32* (2013.01)
(Continued)

(52) U.S. Cl.
CPC .............. *G10L 15/30* (2013.01); *G10L 15/14* (2013.01); *G10L 15/18* (2013.01); *G10L 15/197* (2013.01);
(Continued)

(58) Field of Classification Search
CPC ....... G10L 15/14; G10L 15/18; G10L 15/197; G10L 15/32; G10L 15/30; H04L 63/04; H04L 63/0428
See application file for complete search history.

(56) References Cited

U.S. PATENT DOCUMENTS 4,718,094 A   1/1988  Bahl et al.
4,783,803 A   11/1988 Baker et al.
(Continued)

OTHER PUBLICATIONS

Crocco, M., et al., "Audio Surveillance: A Systematic Review," ACM Computing Surveys, ACM, New York, NY, US, vol. 48, No. 4. Feb. 22, 2016, pp. 1-46.

(Continued)

*Primary Examiner* — Fariba Sirjani
(74) *Attorney, Agent, or Firm* — Hamilton, Brook, Smith & Reynolds, P.C.

(57) ABSTRACT

Methods described herein provide functionality for automatic speech recognition (ASR). One such embodiment performs speech recognition using received speech recognition result candidates, where the received candidates were generated by performing Statistical Language Model (SLM) based speech recognition on one or more frames of audio data. In turn, such an embodiment transmits results of the speech recognition, performed using the received speech recognition result candidates, to a user device via a communications network. Results of the speech recognition are available with lower latency than pure cloud based ASR solution.

20 Claims, 4 Drawing Sheets

Related U.S. Application Data is a continuation of application No. 15/165,496, filed on May 26, 2016, now Pat. No. 9,761,227.

(51) Int. Cl.
*G10L 15/14* (2006.01)
*G10L 15/18* (2013.01)
*G10L 15/197* (2013.01)
*H04L 29/06* (2006.01)

(52) U.S. Cl.
CPC .............. *G10L 15/32* (2013.01); *H04L 63/04* (2013.01); *H04L 63/0428* (2013.01)

(56) References Cited

U.S. PATENT DOCUMENTS

| | | | |
|---|---|---|---|
| 4,803,729 | A | 2/1989 | Baker |
| 4,805,218 | A | 2/1989 | Bamberg et al. |
| 4,805,219 | A | 2/1989 | Baker et al. |
| 4,829,576 | A | 5/1989 | Porter |
| 4,829,578 | A | 5/1989 | Roberts |
| 4,837,831 | A | 6/1989 | Gillick et al. |
| 4,903,305 | A | 2/1990 | Gillick et al. |
| 4,914,703 | A | 4/1990 | Gillick |
| 5,202,952 | A | 4/1993 | Gillick et al. |
| 5,621,859 | A | 4/1997 | Schwartz et al. |
| 6,487,534 | B1* | 11/2002 | Thelen ................ G10L 15/30 704/270 |
| 6,574,597 | B1 | 6/2003 | Mohri et al. |
| 8,412,532 | B2* | 4/2013 | Gruenstein ............. G10L 15/32 704/275 |
| 8,606,568 | B1* | 12/2013 | Tickner ................ G10L 15/1815 704/231 |
| 8,862,467 | B1* | 10/2014 | Casado ................... G10L 15/22 704/231 |
| 9,460,088 | B1* | 10/2016 | Sak ..................... G06F 17/2881 |
| 9,761,227 | B1* | 9/2017 | Quillen ................... G10L 15/14 |
| 2002/0143551 | A1* | 10/2002 | Sharma .................. G10L 15/30 704/270.1 |
| 2003/0182113 | A1 | 9/2003 | Huang |
| 2005/0080632 | A1 | 4/2005 | Endo et al. |
| 2005/0102142 | A1 | 5/2005 | Soufflet et al. |
| 2006/0089857 | A1* | 4/2006 | Zimmerman ........ G06F 21/6245 705/2 |
| 2009/0240488 | A1* | 9/2009 | White ................... G06F 3/0236 704/9 |
| 2010/0031143 | A1* | 2/2010 | Rao ...................... G06F 3/0237 715/261 |
| 2010/0179811 | A1 | 7/2010 | Gupta et al. |
| 2010/0223056 | A1* | 9/2010 | Kadirkamanathan ... G10L 15/02 704/235 |
| 2010/0324901 | A1* | 12/2010 | Carter ................... G10L 15/197 704/255 |
| 2011/0093528 | A1* | 4/2011 | Ahamed ........ H04N 21/234336 709/203 |
| 2012/0059653 | A1 | 3/2012 | Adams et al. |
| 2012/0130709 | A1* | 5/2012 | Bocchieri ............. G10L 15/063 704/201 |
| 2012/0215528 | A1* | 8/2012 | Nagatomo .............. G10L 15/30 704/211 |
| 2012/0271631 | A1* | 10/2012 | Weng ..................... G10L 15/063 704/243 |
| 2013/0030804 | A1* | 1/2013 | Zavaliagkos ........... G10L 15/26 704/235 |
| 2014/0163977 | A1 | 6/2014 | Hoffmeister et al. |
| 2014/0207442 | A1* | 7/2014 | Ganong, III .......... H04W 12/02 704/201 |
| 2014/0278366 | A1 | 9/2014 | Jacob et al. |
| 2015/0025890 | A1 | 1/2015 | Jagatheesan et al. |
| 2015/0039317 | A1* | 2/2015 | Klein ...................... G10L 15/22 704/275 |
| 2015/0088499 | A1* | 3/2015 | White .................... G06F 3/0482 704/235 |
| 2015/0120288 | A1* | 4/2015 | Thomson ................ G10L 15/22 704/231 |
| 2015/0120290 | A1 | 4/2015 | Shagalov |
| 2016/0012819 | A1 | 1/2016 | Willett et al. |
| 2016/0111090 | A1* | 4/2016 | Holdren .................. G10L 15/20 704/251 |
| 2017/0278511 | A1* | 9/2017 | Willett ..................... G10L 25/84 |
| 2018/0211668 | A1* | 7/2018 | Willett ..................... G10L 15/30 |

OTHER PUBLICATIONS

Notification of Transmittal of the International Search Report and the Written Opinion of the International Searching Authority, or the Declaration, PCT/US2017/034504, "Method and System for Hybrid Decoding for Enhanced End-User Privacy and Low Latency," pp. 1-16, dated Sep. 1, 2017.

Notification Concerning Transmittal of International Preliminary Report on Patentability & the International Preliminary Report on Patentability, PCT/US2017/034504, entitled, "Method and System for Hybrid Decoding for Enhanced End-User Privacy and Low Latency," dated Nov. 27, 2018, 8 pages.

Bahl et al., "Obtaining Candidate Words by Polling in a Large Vocabulary Speech Recognition System," IEEE, pp. 489-492 (Sep. 1988).

Bahl et al., "Matrix Fast Match: A Fast Method for Identifying a Short List of Candidate Words for Decoding," IEEE, pp. 345-348 (Feb. 1989).

Bahl et al., "Constructing Groups of Acoustically Confusable Words," IEEE, pp. 85-88 (Feb. 1990).

Wikipedia, "Finite-state Machine," https://en.wikipedia.org/wiki/Finite-state_machine, pp. 1-9, accessed Mar. 23, 2016.

Stanford University Computer Science. "Basics of Automata Theory," http://cs.stanford.edu/people/eroberts/courses/soco/projects/2004-05/automata-theory/basics.html, pp. 1-5, accessed Mar. 23, 2016.

Mohri, M. et al., "Weighted Finite-State Transducers in Speech Recognition," Article Submitted to Computer Speech and Language, pp. 1-26 (Oct. 2001).

Miranda, et al., "A Platform of Distributed Speech Recognition for the European Portuguese Language", PROPOR 2008, pp. 182-191.

Internet Archive WaybackMachine, HTTPS Webpage, HTTPS or SSL Encryption, 2 pages, Nov. 2, 2006.

* cited by examiner

US 10,803,871 B2

METHOD AND SYSTEM FOR HYBRID DECODING FOR ENHANCED END-USER PRIVACY AND LOW LATENCY

RELATED APPLICATION(S)

This application is continuation of International Application No. PCT/US2017/034504, which designated the United States and was filed on May 25, 2017, published in English, which is a continuation of U.S. application Ser. No. 15/165,496, filed on May 26, 2016, now U.S. Pat. No. 9,761,227, issued on Sep. 12, 2017. The entire teachings of the above applications are incorporated herein by reference.

BACKGROUND

Advances in speech processing technology have led to improved speech recognition performance, which, in turn, has enabled wide spread use of speech recognition in applications that run on multiple platforms. Speech recognition systems convert input audio, including speech, to recognized text. During recognition, audio data is typically divided into a sequence of discrete time vectors (e.g. 10 ms segments) called "frames." This sequence of frames is converted into a sequence of words by a decoding process that selects and aligns statistical models of possible word acoustics with these input frames. These statistical word models typically are composed of sub-word unit models (e.g. phoneme or syllable models). Each sub-word unit model consumes one or more frames of audio data.

SUMMARY OF THE INVENTION

Speech recognition applications can benefit from decreased latency and enhanced user privacy. Embodiments of the present invention provide improved methods and systems for speech recognition.

One example embodiment of the present invention begins by performing speech recognition using received speech recognition result candidates where the candidates have been generated by performing Statistical Language Model (SLM) based speech recognition on one or more frames of audio data. In turn, such an embodiment transmits to a user device, via a communications network, results of the speech recognition performed using the received speech recognition result candidates. According to an embodiment, the speech recognition result candidates are received from the user device at a server that performs the speech recognition using the received candidates.

Another embodiment further comprises only receiving personal data of a user that is related to the received speech recognition result candidates. According to another embodiment, the received speech recognition result candidates are compressed. In one embodiment, the received speech recognition result candidates are compressed by using a compressed pronunciation form of the speech recognition result candidates. In an alternative embodiment, the received speech recognition result candidates are encrypted.

According to an embodiment of the present invention, the received speech recognition result candidates resulted from a first SLM based speech recognition. This first SLM based speech recognition is followed by performing the speech recognition, which includes performing a second SLM based speech recognition using the received speech recognition result candidates. In such an embodiment, the first SLM based speech recognition may be performed on the user device. In another embodiment, the first SLM based speech recognition is based on at least one of: a unigram SLM, a pruned n-gram SLM and a SLM implemented using a finite state machine (FSM).

An alternative embodiment of the method further includes destroying a user's personal information related to the received speech recognition result candidates upon performing the speech recognition using the received candidates. In another embodiment, the received speech recognition result candidates include adapted audio features that are feature adapted to be speaker independent.

Another embodiment of the present invention is directed to a computer system for performing automatic speech recognition. Such a computer system embodiment comprises a processor and a memory with computer code instructions stored thereon. The processor and the memory, according to such an embodiment, with the computer code instructions, are configured to cause the system to perform speech recognition using received speech recognition result candidates, where the received speech recognition result candidates were generated by performing SLM based speech recognition on one or more frames of audio data. Further, in such an embodiment, the processor and memory are further configured to cause the system to transmit to a user device, via a communications network, results of the speech recognition performed using the received speech recognition result candidates.

According to a system embodiment, the speech recognition result candidates are received from the user device at the computer system. In yet another embodiment, the processor and the memory, with the computer code instructions, are further configured to cause the system to only receive personal data of a user of the user device that is related to the received speech recognition result candidates. In one such embodiment of the system, the received speech recognition result candidates are compressed and/or encrypted. In a further system embodiment, the received speech recognition result candidates are compressed using a compressed pronunciation form of the speech recognition result candidates.

In yet another embodiment, the received speech recognition result candidates resulted from a first SLM based speech recognition performed on the user device which is, in turn, followed by the computer system performing the speech recognition using the received speech recognition result candidates, which includes the computer system performing a second SLM based speech recognition. In an alternative system embodiment, the processor and the memory, with the computer code instructions, are further configured to cause the system to destroy the system's copy of a user's personal information related to the received speech recognition result candidates upon completing the speech recognition using the received candidates, which makes use of the user's personal information. According to yet another embodiment, the received speech recognition result candidates include audio features that are feature adapted, such that the feature-adapted audio features are speaker independent.

An embodiment of the present invention is directed to a computer program product for performing automatic speech recognition. The computer program product, according to such an embodiment, comprises one or more computer-readable tangible storage devices and program instructions stored on at least one of the one or more tangible storage devices. The program instructions, when loaded and executed by a processor, cause an apparatus associated with the processor to: perform speech recognition using received speech recognition result candidates, the received speech recognition result candidates having been generated by performing SLM based speech recognition on one or more frames of audio data. Further, these program instructions cause the apparatus to transmit to a user device, via a communications network, the results of the speech recognition performed using the received speech recognition result candidates.

Another embodiment provides a method of performing automatic speech recognition that begins by receiving speech recognition result candidates from a user device. In such an embodiment, the received speech recognition result candidates were generated by performing speech recognition on one or more frames of audio data on the user device, where the speech recognition on the one or more frames of audio data combines two parallel layers of speech recognition that utilize language models capable of being stored on the user device and where, the two parallel layers include a command-oriented finite state based recognizer layer and a SLM based pre-filter layer configured to utilize device information local to the user device. In turn, speech recognition is performed using the received speech recognition result candidates and results of the speech recognition performed using the received speech recognition result candidates are transmitted to the user device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications, and references cited herein are incorporated by reference in their entirety.

Hybrid speech recognition approaches include command-and-control type recognition using small finite state (FST) grammars on a local-device and accurate Statistical Language Model (SLM) based dictations computed in a cloud, e.g., server. In such approaches, small FST grammars fit in the limited local memory of an end-user's (local) device and moreover, the amount of computations required for performing the speech recognition with acceptable latency using these FST grammars is well within the scope of what is typically available on such a device. However, dictation speech recognition based on larger SLM models usually requires a much larger memory foot print and enhanced computational abilities to achieve good performance. These SLM models cannot be stored on the local device. Thus, existing methods utilize the much larger memory and computational resources available on a server in the cloud to provide speech recognition using SLM models.

Embodiments of the present invention provide enhancements to existing hybrid speech recognition approaches by performing SLM recognition, such as a pre-filter or fast-match, in addition to limited command-grammar recognition, on the local device. One example embodiment of the present invention involves performing speech recognition in a two-stage process. In such an embodiment, an initial pass of recognition produces speech recognition result candidates using SLM based speech recognition on one or more frames of audio data. This pass of recognition is carried out on an end-user's device. These result candidates are transmitted from the user device, via a communications network to a destination computer, e.g., a server. The server then performs a SLM based speech recognition using the received speech recognition result candidates.

In speech recognition, personal information about a user is often used in order to enhance the accuracy of the recognition. This personal information might be related to the names of people in a user's address book, the names of applications installed on the user's device, and/or a variety of other information naturally present on a user's device as a result of the user's regular activities and use of the device. Another embodiment of the invention specifies that personal data transmitted from a user's device, to a server, for further speech recognition shall be minimized. In such an embodiment, only personal data related to the speech recognition candidates currently being evaluated will be transmitted to a server.

Figure 1:
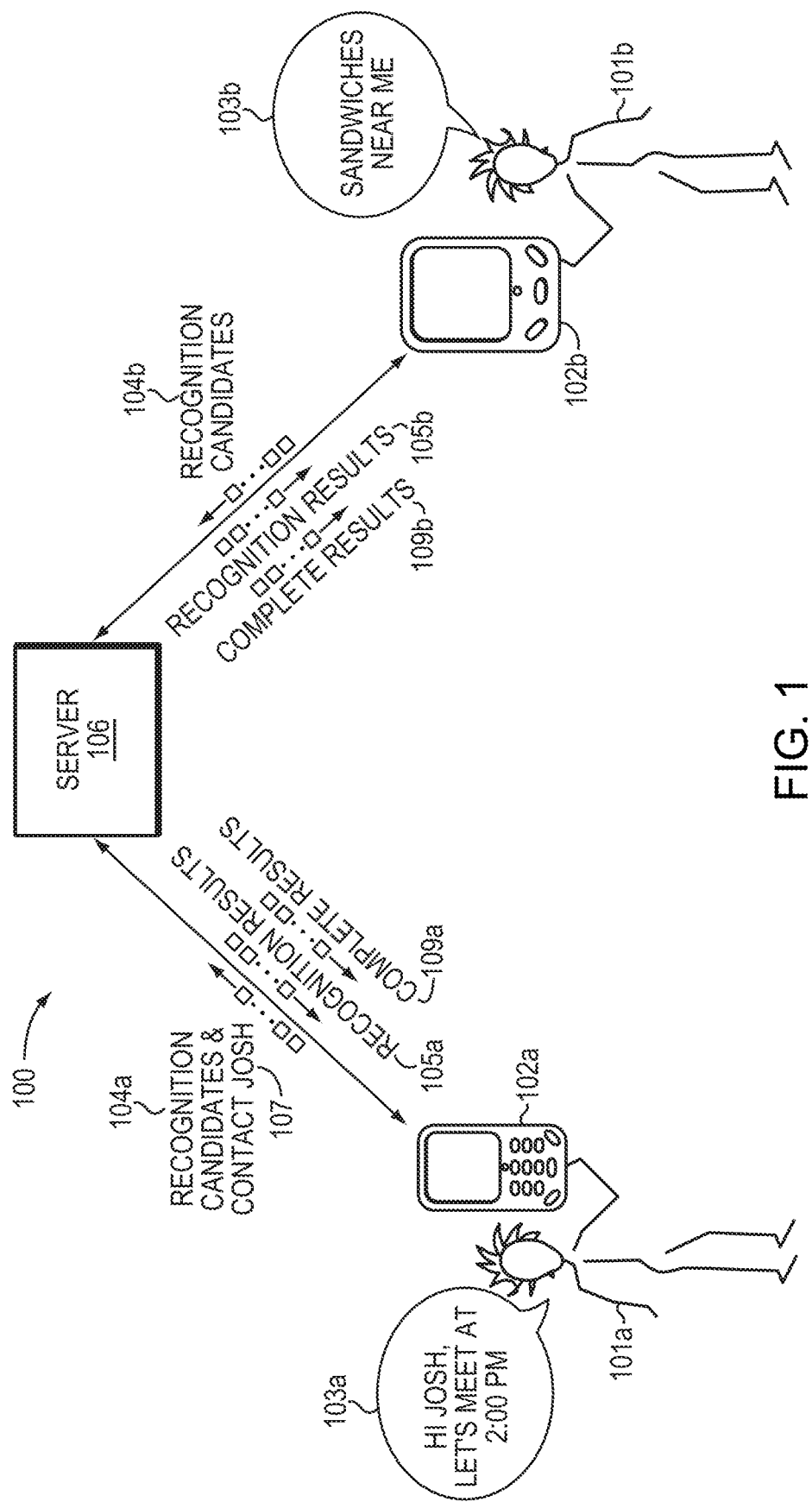
FIG. 1 is a simplified diagram illustrating an implementation of performing automatic speech recognition according to an embodiment.

FIG. 1 illustrates a simplified system 100 for performing automatic speech recognition according to an embodiment of the present invention. The system 100 includes the users 101a and 101b each with respective end-user devices 102a and 102b and a back end server 106. The end user devices 102a and 102b may be any user devices known in the art, such as cellular phones, laptops, tablets, vehicle communication systems, televisions, etc. According to an embodiment, the user devices 102a and 102b are devices with limited memory and computational capabilities as compared to the server 106. In such an embodiment, the user devices 102a and 102b may not have enough memory to store a SLM as is typically used in prior art speech recognition methods. The server 106 may be any computing device known in the art that provides sufficient computational power and memory to perform the methods described herein. While only the single server 106 and the two users 101a and 101b are depicted, the system may include any number of server devices 106 and users 101, each with any number of respective end-user devices 102. Further, in the system 100, any number of server devices 106 may be communicatively coupled to form a cloud capable of servicing any number of end-user devices 102. In the system 100, the end-user devices 102a and 102b are connected to the server 106 via any communication means known in the art.

In an example embodiment, the system 100 performs automatic speech recognition for the users 101a and 101b. In one such example, the user 101a makes an indication via the user device 102a that speech recognition is desired, e.g., by selecting that speech dictation is desired, and, in turn, the user 101a speaks the phrase 103a "Hi Josh, Let's meet at 2:00 p.m." As the user 101a is speaking, SLM based speech recognition is performed on the user-device 102a, and the speech recognition result candidates 104a based on one or more frames of speech audio are sent to the server 106.

According to an embodiment, performing the speech recognition on the user device 102a includes determining acoustic/non-acoustic pronunciation guessing of the speech audio. In such an embodiment, the acoustic/non-acoustic pronunciation guessing determines a guess as to how to pronounce words in the speech audio that are not found in the dictionary of the device 102a. In an embodiment, the user device 102a may modify confidence results of the sent candidates 104a using the contact 107. Further, according to an embodiment, the user device 102a may also send the contact name Josh 107 from a contact list of the device 102a to the server 106. In such an embodiment, the contact Josh 107 may be sent in a compressed pronunciation form. Additionally, as the user device 102a is performing the SLM based speech recognition that generates the recognition candidates 104a, the user device 102a may also perform speech recognition locally based on a small FST command grammar stored on the device 102a. This FST based recognition produces local FST based speech recognition results (not shown).

To continue, upon receiving the speech recognition candidates 104a and contact Josh 107 from the user device 102a, the server 106 performs a second SLM based speech recognition and, in turn, provides the results 105a to the end user device 102a. According to an embodiment, the results 105a are partial server speech recognition results and the results 105a are provided to the end user device 102a as the recognition progresses on the server. In an embodiment, once the recognition is completed on the server 106, the server 106 provides the full server speech recognition results 109a. According to an embodiment, the end user device 102a processes the recognition results 105a, the recognition candidates 104a, and/or the complete results 109a and displays the results of the speech recognition on the user device 102a. Moreover, in an embodiment, the end user device 102a may also process local FST based speech recognition results as well as the full server speech recognition results 109a, recognition results 105a, and the recognition candidates 104a in determining the final results of the speech recognition to be displayed to the user 101a. In an embodiment, the user device 102a may display the results of the speech recognition prior to receiving the recognition results 105a and/or the full server recognition results 109a when the locally performed speech recognition results, e.g., the recognition candidates 104a and/or local FST based speech recognition results, have a confidence above a particular threshold. In such an embodiment, the confidence of the local results may be compared to the confidence of the recognition results 105a, and the local results may be displayed when the confidence of the local recognition results is sufficiently high, compared to the confidence of the recognition results 105a.

The system 100 additionally performs speech recognition for the user 101b. The system 100 may perform speech recognition according to the same principles described hereinabove in relation to the user 101a. In this example embodiment of the system 100, the user 101b is performing a search and chooses to enter the search criteria via voice. This is indicated by the user 101b, and the user 101b speaks the phrase "sandwiches near me" 103b. As the user 101b is speaking, the user device 102b is performing a first SLM based speech recognition and sending results, i.e., the recognition candidates 104b to the server 106. In an embodiment, the user device 102b also performs speech recognition locally based upon small FST command grammars and produces local speech recognition results (not shown). Upon receipt of the candidates 104b, the server 106 performs a second SLM based speech recognition and sends the results 105b from this second SLM based speech recognition to the user device 102b as the second SLM based speech recognition progresses. Thus, according to an embodiment, the results 105b may be partial results. Further, the server 106 may send complete speech recognition results 109b upon completing the second SLM based speech recognition. The user device 102b proceeds to process the results 105b, the candidates 104b, results from a local FST based speech recognition (not shown) and/or the complete speech recognition results 109b from the server 106 and displays the speech recognition results on the screen of the user device 102b. According to an embodiment, the speech recognition results to be displayed are determined based upon confidence scores that accompany the various results.

The method of dividing the SLM recognition task between the end user devices 102 and the cloud (server 106) has many advantages. Firstly, it reduces latency in performing speech recognition because no additional set-up for pre-filter or fast-match needs to be created on the server 106 as the server 106 receives the speech recognition result candidates 104 from the local devices 102. Secondly, much of the user-specific information, that would normally have to persist in the cloud using existing methods, never needs to reside in the server 106 using the implementation depicted in FIG. 1. For instance, in the example described hereinabove in relation to the user 101a, only words present in a user's contact list that are also likely present in the user's speech would be transmitted, e.g. contact Josh 107. Similarly, rather than sending user information/data, embodiments can simply indicate that speech recognition candidates have a higher confidence. For example, in an embodiment, if an end-user were in a specific location and asking about points of interest related to that location, the end user device can indicate to the server 106 that certain words have enhanced probability, without directly revealing the location. To illustrate, if the end user is in Orlando, Fla., and asks their device "take me to Epcot Center" the end user device may flag "Epcot" and "Center" appearing in the word-active lists as having higher than normal language-model probability.

In an embodiment of the system 100, the end user devices 102 do not transfer audio of the spoken phrases 103. For instance, the recognition candidates 104a and 104b may only include acoustic features of the spoken phrases 103a and 103b. Thus, such an embodiment may only transfer features that cannot easily be used to reconstruct the user's voice and that are "speaker independent" and that tend to eliminate information that can be used to uniquely identify a user. The terms "acoustic features" and "audio features" are used interchangeably herein. Further, in another embodiment of the system 100, vocabulary present in the end-user devices 102 that does not exist in the standard dictionary on the server 106 speech recognition system is transferred in a compressed pronunciation form to the server 106. The server 106 does not need to see a transcription of these words (words that do not exist in the standard dictionary), but would instead only receive data regarding a device 102 assigned word-index and the device 102 provided pronunciation. Moreover, according to an embodiment, the server 106 deletes this data after the acoustic features of the utterance are processed. In an alternative embodiment, automatically inferring pronunciations for unknown user-specific words occurs at the end-user devices 102 and can optionally involve acoustic knowledge provided by the end-users 101. Such a speech recognition scheme can be more accurate than cloud-based pronunciation, while simultaneously offering reduced latency.

Another embodiment of the system 100 provides a method of performing automatic speech recognition that begins by receiving speech recognition result candidates (e.g., the candidates 104b) from a user device (e.g., the user device 102b). In such an embodiment, the received speech recognition result candidates 104b are generated by performing speech recognition on one or more frames of audio data on the user device 102b, where the speech recognition on the one or more frames of audio data combines two parallel layers of speech recognition that utilize language models capable of being stored on the user device 102b and where, the two parallel layers include a command-oriented finite state based recognizer layer and a SLM based pre-filter layer configured to utilize device information local to the user device 102b. In turn, speech recognition is performed on the server 106 using the received speech recognition result candidates 104b and results of the speech recognition (e.g., results 105b) performed using the received speech recognition result candidates 104b are transmitted to the user device 102b.

As described herein, embodiments of the present invention perform hybrid speech recognition where the local device, e.g., user device, performs both a pre-filter or fast-match and a SLM based speech recognition. According to an embodiment, this is implemented by employing a SLM that is small enough to fit on the local device memory. In an embodiment, a highly-compressed version of the output of this locally performed SLM, which may include per-frame active word-lists and confidence scores, is transferred to the cloud in real time in addition to acoustic features. In turn, more accurate passes of SLM based recognition can be performed by a server in the cloud, constrained by these initial SLM results. Embodiments of the invention can also be implemented to maximize end-user privacy while providing accurate, low-latency, hybrid speech recognition. Further, embodiments can also be configured to allow local command grammars on an end-user device to provide lowest-possible latency results when these local command grammars provide the correct transcription. Moreover, embodiments can implement transparent back-off to accurate cloud based transcription that leverages knowledge of personal information about the end user present on the local device.

Embodiments of the present invention provide numerous benefits over existing methods of speech recognition. For instance, the results of the speech recognition are available with lower latency than pure cloud based automatic speech recognition (ASR) solutions because time consuming aspects of recognition setup required in the pre-filter pass are avoided in the cloud and carried out in a background fashion on the end-user device. Further, embodiments may only transfer the information needed for decoding an individual utterance to the cloud. Personal user information, e.g., contact lists, music library lists, etc., do not need to be transferred in their entirety, only the words that are likely to have been spoken in a given utterance, as determined by the pre-filter. Moreover, at the end of a recognized utterance, the personal user information can be purged from the cloud so that no personal information persists long-term outside the end-user owned device. End-user privacy may be further enhanced by transmitting acoustic features that are feature-adapted to place them in a "speaker independent" form that destroys most of the acoustic information related to the end-user identity. Similarly, embodiments may never transmit user-specific acoustic adaptation parameters to the cloud so as to prevent the adaptation parameters from being used to identify the user. Further still, in an embodiment, the end-user device can carry out additional decoding of task-specific ASR locally using finite-state-grammars in parallel to the cloud based decode and can elect to use the local results even before the cloud results become available if the local results have high confidence. Such functionality allows the end user to execute device specific commands, e.g., "Call Mom," with the best possible latency while transparently deferring to more accurate, cloud-enhanced transcription when appropriate. Partial recognition results from the cloud can also be passed back to the device in real time as they become available to assist in the confidence decision.

Figure 2:
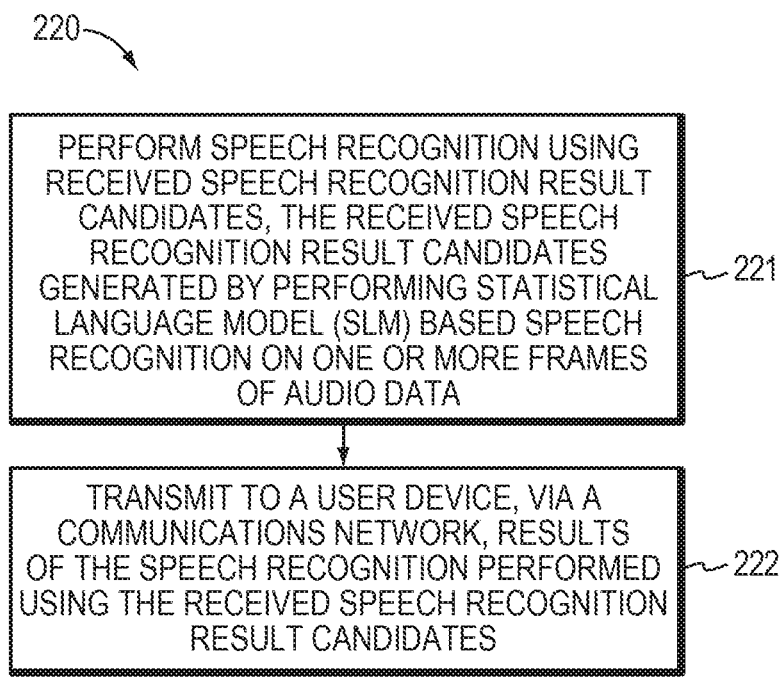
FIG. 2 is a flowchart depicting a method of performing speech recognition according to at least one example embodiment.

FIG. 2 is a flow diagram of a method 220 for performing automatic speech recognition according to an embodiment of the present invention. The method 220 begins by performing speech recognition using received speech recognition result candidates (221). In such an embodiment, the received speech recognition result candidates are generated by a SLM based speech recognition performed on one or more frames of audio data. According to an embodiment, the received candidates may result from a SLM based speech recognition performed on frames of audio spoken by a user, which for instance, may entail performing the SLM based recognition on 50 to 100 frames per second. In an embodiment, the received speech recognition results candidates include at least one of: per-frame active lists, acoustic features, and neural-network bottleneck features. In one such embodiment of the method 220, the received speech recognition result candidates are compressed and/or encrypted. Embodiments of the method 220 may utilize any compression or encryption techniques known in the art. For example, the Rivest-Shamir-Adleman (RSA) method. In a further embodiment of the method 220, the speech recognition result candidates are received from the user device (to which the results are sent 222), at a server that performs the speech recognition using the received candidates (221).

According to an embodiment, the speech recognition performed 221, is a SLM based speech recognition. In an embodiment of the method 220, the received speech recognition result candidates used in the speech recognition performed 221 are received from the user device to which the results are transferred 222. In yet another embodiment, the received speech recognition result candidates resulted from a first SLM based speech recognition, and the speech recognition performed 221 is a second SLM based speech recognition. In such an embodiment, this "first" SLM based speech recognition may be performed on a user device as described hereinabove in relation to FIG. 1. According to an embodiment, the SLM based speech recognition used to generate the received speech recognition result candidates is based on at least one of: a unigram SLM, a pruned n-gram SLM, and a SLM implemented using a finite state machine (FSM). Moreover, according to an embodiment, the SLM used to generate the received candidates may be any SLM capable of being stored on the user device.

To continue, the method 220 transmits to a user device, via a communications network, results of the speech recognition performed using the received speech recognition result candidates 222. According to an embodiment of the method 220, the results are transferred 222 via any means known in the art, e.g., a wide area network (WAN) or local area network (LAN), to any user device known in the art, such as a mobile phone, laptop computer, tablet computer, etc. For instance, in an embodiment, the results are transferred 222 to a tablet computer via a cellular data network.

Embodiments of the method 220 may further include functionality so as to maximize end-user privacy, e.g., privacy of a user desiring speech recognition. Such an embodiment may include receiving personal data of a user of the user device that is only related to the received speech recognition result candidates. For example, rather than sending data related to an end user's entire music library, only data relevant to the speech recognition result candidates would be sent. Further protection may be provided by configuring a computing device implementing the method 220, to delete user data upon completing the speech recognition or completing the portion of the speech recognition that utilizes the user data. In another embodiment, the received speech recognition result candidates are a compressed pronunciation form of the speech recognition result candidates. According to yet another embodiment, the received speech recognition result candidates include audio features that are feature-adapted such that the feature-adapted features are speaker independent. In such an embodiment, the audio features are extracted from the audio data and then adapted to convert the features into speaker independent audio features.

Embodiments of the present invention, such as the system 100 and method 220 use two or more passes of speech recognition. According to embodiments, an initial pass of speech recognition runs on an end-user device. In one such embodiment, this initial pass combines two parallel layers of speech recognition that are gated between based on the results of a confidence model. These two parallel layers may include a small command-oriented FST based recognizer and a pre-filter that uses SLM to provide a first pass of speech recognition. Example SLMs used for the SLM performed on the user device include a unigram language model, arranged with a "prefix tree" structure, including weight-pushing and right-generic triphone acoustic or a small highly-pruned bigram (or ngram) derived Weighted Finite State Transducer (WFST) language model, optimized by determinization and optionally, minimized as well. The aforementioned highly pruned model may also be combined with right-generic triphone acoustic models.

According to an embodiment, the aforementioned two recognition layers implemented on the user device utilize small language models that will fit in the memory of current generation embedded devices. Further, the computational requirements for these layers are also modest and can likewise be implemented on embedded devices, such as phones, televisions, and automobiles. Such methods are particularly un-burdensome to computational resources in devices that are capable of supplying several watts of power continuously, e.g., televisions and automobiles.

According to an embodiment of the present invention, the output from the initial speech recognition, e.g., the speech recognition result candidates 104, is relatively small and may be transmitted to the cloud in real time. The transferred output may be per-frame active word lists which are typically about 200 words, and word-end scores. In such an embodiment, the word lists may be compressed by assigning word indices in order of frequency and only transmitting deltas between active words. Further, embodiments may utilize run-length or other compression techniques to further compress word lists from blocks of subsequent audio frames. Moreover, word-end scores may be temporally differenced and quantized to a few bits without any penalty in accuracy as well. By utilizing the aforementioned compression techniques, alone or in combination, embodiments can communicate all of the information from a user device to the cloud in real time without overloading the available communication channels.

According to an embodiment, after the initial passes of recognition are performed on the user device, the subsequent passes of speech recognition are performed in the cloud. In such an embodiment, the cloud-based speech recognition may be constrained by a temporally smoothed list of the word beginning times calculated on the local device in the initial speech recognition pre-filter layer. The cloud-based recognition passes may be performed using full phonetic-context phone models and complex, memory intensive, language models. According to an embodiment, the cloud recognition system provides partial-recognition results that are, in turn, transmitted back to the end-user device as recognition progresses.

In an embodiment of the present invention, while the cloud-based recognition is being performed, the confidence of the command-and-control FST recognition layer is locally computed on the end-user device. The confidence calculations may use partial results received from the cloud and corresponding confidence scores of these partial results received from the cloud dictation recognizer. In an embodiment, if the confidence of the local FST result is high at the end of the utterance, the client device will return those locally provided recognition results without waiting for the final cloud result.

Embodiments of the present invention may further utilize local device information, e.g., contact lists, song titles, etc., to enhance the vocabulary present in the pre-filter layer of the user-device-based speech recognition. Further, in an embodiment, user location may also be used to re-weight vocabulary probabilities for points of interest and the probabilities in the pre-filter layers which are part of the user-device-based speech recognition. For instance, the probabilities in the pre-filter layer can be adjusted in the background as the user location changes. When performing speech recognition, words present in the per-frame active list whose probabilities have been adjusted in this fashion may be flagged so that the cloud language models can be updated appropriately. Moreover, in another embodiment, words not present in the stock vocabulary can have their pronunciations guessed, in the background, before recognition is carried out. In such an embodiment, these pronunciations, and not the word transcripts themselves, may be transferred in a compressed form in an on-demand basis to the cloud.

In yet another embodiment of the present invention, a user has the option to provide audio examples for new words to be added to the vocabulary to enhance the automatically generated pronunciations. In such an embodiment, these user provided pronunciation examples are processed locally by the user device and similarly, locally stored, so as to best protect user privacy.

This method of dividing the recognition task between the end-user device and cloud has numerous advantages. For example, many aspects of adapting cloud recognition to take into account user-provided information must be done at the beginning of recognition, once a user has started speaking. These start-up costs can be significant, and add to latency. In contrast, embodiments of the present invention make modifications to the recognition vocabulary and language model in the background, long before a request for speech recognition. Further, in conventional approaches, sensitive end-user information resides continuously in the cloud. In embodiments of the present invention, to the extent possible, user-specific information never leaves the user device, and user-specific information that does leave the user device, is deleted at the end of recognition. For example, only words that are present in a user's contact list that are also likely present in their speech are transmitted.

Embodiments further enhance privacy by not transferring audio to the cloud. In an embodiment, only transformed acoustic features are transferred from the user device to the cloud. For example, embodiments may transfer bottleneck features from an acoustic Deep Neural Network (DNN) rather than audio or acoustic features. Said features preserve a minimum of information about the speaker identity and cannot generally be used in an automated process to track a user based upon her voice. Implementing such a scheme provides unprecedented levels of assurance that personal information remains private.

Figure 3:
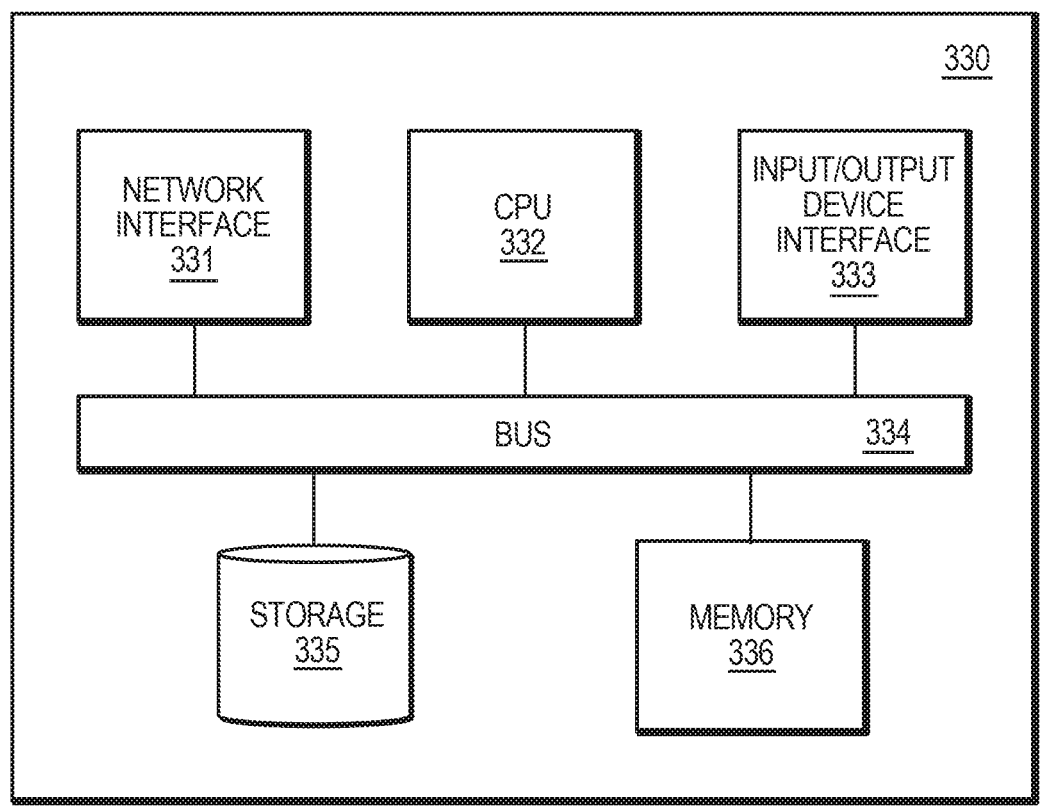
FIG. 3 is a visual depiction of a computer system for performing automatic speech recognition according to an embodiment of the present invention.

FIG. 3 is a simplified block diagram of a computer-based system 330, which may be used to perform automatic speech recognition according to the principles of the present invention. The system 330 comprises a bus 334. The bus 334 serves as an interconnect between the various components of the system 330. Connected to the bus 334 is an input/output device interface 333 for connecting various input and output devices, such as a keyboard, mouse, display, speakers, etc. to the system 330. A central processing unit (CPU) 332 is connected to the bus 334 and provides for execution of computer instructions. Memory 336 provides volatile storage for data used for carrying out computer instructions. Storage 335 provides non-volatile storage for software instructions, such as an operating system (not shown). The system 330 also comprises a network interface 331 for connecting to any variety of networks known in the art, including WANs and LANs.

It should be understood that the example embodiments described herein may be implemented in many different ways. In some instances, the various methods and machines described herein may each be implemented by a physical, virtual, or hybrid general purpose computer, such as the computer system 330 or a computer network environment such as the computer environment 440 described hereinbelow in relation to FIG. 4. The computer system 330 may be transformed into the machines that execute the methods (e.g., 220) described herein, for example, by loading software instructions into either memory 336 or non-volatile storage 335 for execution by the CPU 332.

The system 330 and its various components may be configured to carry out any embodiments of the invention described herein. For example, according to an embodiment of the invention, the system 330 receives speech recognition result candidates, generated by a SLM based speech recognition, via the network interface 331. In turn, the system 330, by executing program instructions stored in the memory 336 or storage 335, performs speech recognition using the received speech recognition result candidates. To continue, the system 330 transfers results, of the performed speech recognition to a user device via the network interface 331. According to an embodiment, the system 330 transfers partial results to the user device as the partial results become available.

The system 330 may implement the various embodiments described herein utilizing any combination of hardware, software, and firmware modules, operatively coupled, internally, or externally, to the system 330, that are configured to implement the various embodiments of the invention described herein.

Figure 4:
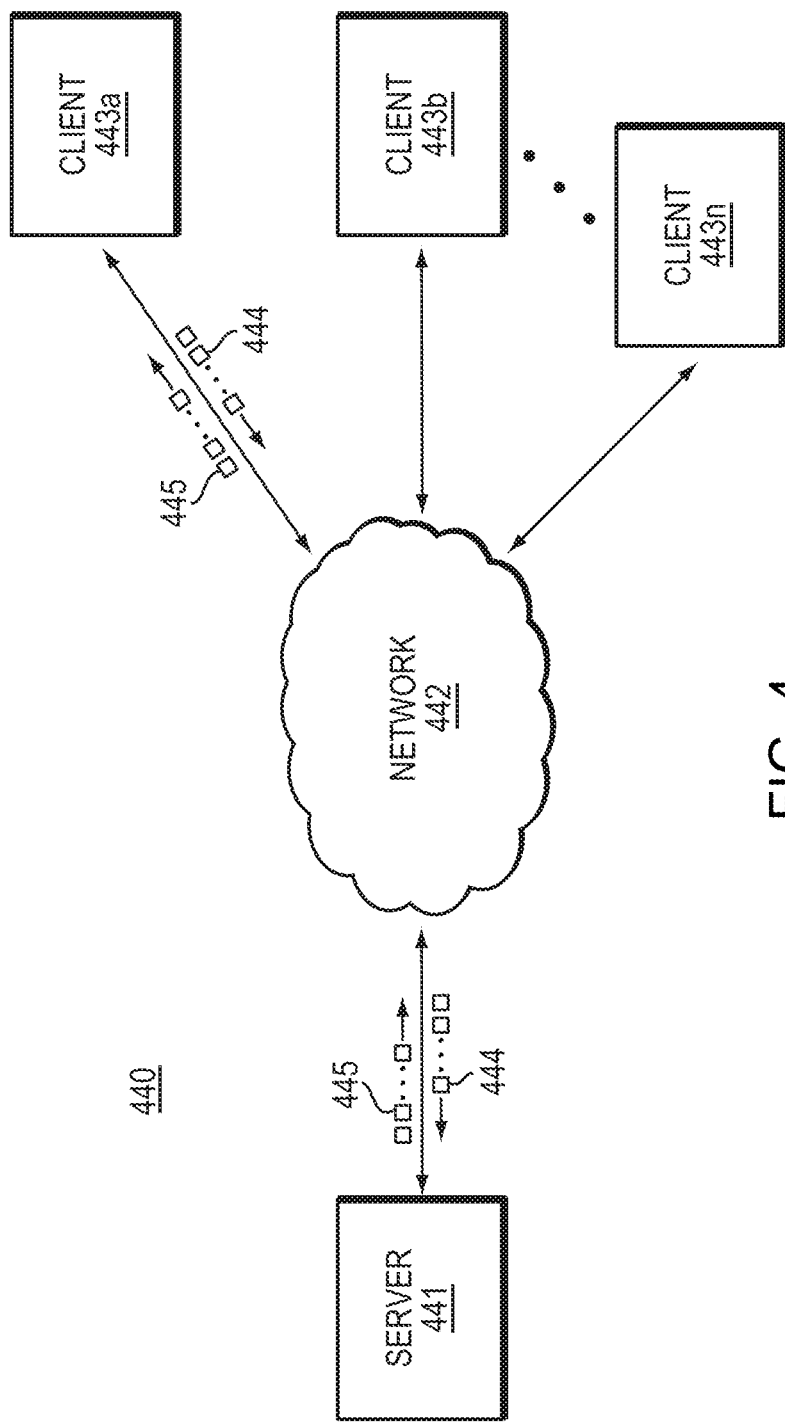
FIG. 4 is a simplified diagram of a computer network environment in which an embodiment of the present invention may be implemented.

FIG. 4 illustrates a computer network environment 440 in which embodiments of the present invention may be implemented. In the computer network environment 440, the server 441 is linked through a communications network 442 to the clients 443a-n. The environment 440 may be used to allow the clients 443a-n, alone or in combination with the server 441, to execute the various methods described hereinabove. In an example embodiment, the client 443a sends speech recognition result candidates 444 via the network 442 to the server 441. In response, the server 441 performs speech recognition using the received candidates 444 and transfers the results 445 via the network 442 to the client 443a.

It should be understood that the example embodiments described herein may be implemented in many different ways. In some instances, the various methods and machines described herein may each be implemented by a physical, virtual, or hybrid general purpose computer, or a computer network environment.

Embodiments or aspects thereof may be implemented in the form of hardware, firmware, or software. If implemented in software, the software may be stored on any non-transitory computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of performing automatic speech recognition, the method implemented by a processor executing program instructions stored in memory and comprising:

performing speech recognition using speech recognition result candidates received from a user device via a communications network, the speech recognition result candidates generated by the user device's performing speech recognition on one or more frames of audio data, the speech recognition performed by the user device on the one or more frames of audio data combining two parallel layers of speech recognition that utilize language models stored on the user device, wherein at least one layer of the two parallel layers is a Statistical Language Model (SLM) based layer; and transmitting to the user device, via the communications network, results of the speech recognition performed using the speech recognition result candidates.

2. The computer-implemented method of claim 1 wherein the performing speech recognition using speech recognition result candidates further comprises:
performing speech recognition using both the speech recognition result candidates and personal data of a user of the user device that is only related to the speech recognition result candidates.

3. The computer-implemented method of claim 1 further comprising:
destroying a user's personal information related to the speech recognition result candidates upon performing the speech recognition using the speech recognition result candidates.

4. The computer-implemented method of claim 1 wherein the SLM based layer is a first SLM based layer and wherein performing the speech recognition using the speech recognition result candidates employs a second SLM based layer.

5. The computer-implemented method of claim 1 wherein the speech recognition result candidates are compressed.

6. The computer-implemented method of claim 1 wherein the speech recognition result candidates are a compressed pronunciation form of the speech recognition result candidates.

7. The computer-implemented method of claim 1 wherein the speech recognition result candidates are encrypted.

8. The computer-implemented method of claim 1 wherein the speech recognition on the one or more frames of audio data combining two parallel layers is performed on the user device.

9. The computer-implemented method of claim 1 wherein the SLM layer is based on at least one of:
a unigram SLM;
a pruned n-gram SLM; and
a SLM implemented using a finite state machine (FSM).

10. The computer-implemented method of claim 1 wherein the speech recognition result candidates include audio features that are feature-adapted, the feature-adapted audio features being speaker independent.

11. The computer-implemented method of claim 1 wherein at least one layer of the two parallel layers is a command-oriented finite state (FST) recognizer layer.

12. The computer-implemented method of claim 1 wherein the SLM based layer is configured to utilize device information local to the user device.

13. A computer system for performing automatic speech recognition, the computer system comprising:
a processor; and
a memory with computer code instructions stored thereon, the processor and the memory, with the computer code instructions, being configured to cause the system to:
perform speech recognition using speech recognition result candidates received from a user device via a communications network, the speech recognition results candidates generated by the user device's performing speech recognition on one or more frames of audio data, the speech recognition performed by the user device on the one or more frames of audio data combining two parallel layers of speech recognition that utilize language models stored on the user device, wherein at least one layer of the two parallel layers is a Statistical Language Model (SLM) based layer; and
transmit to the user device, via the communications network, results of the speech recognition performed using the speech recognition result candidates.

14. The system of claim 13 wherein, in performing the speech recognition using speech recognition result candidates, the processor and the memory, with the computer code instructions, are further configured to cause the system to:
perform speech recognition using both the speech recognition result candidates and personal data of a user of the user device that is only related to the speech recognition result candidates.

15. The system of claim 13 wherein the processor and the memory, with the computer code instructions, are further configured to cause the system to:
destroy a user's personal information related to the speech recognition result candidates upon performing the speech recognition using the speech recognition result candidates.

16. The system of claim 13 wherein the speech recognition on the one or more frames of audio data combining two parallel layers is performed on the user device.

17. The system of claim 13 wherein the speech recognition result candidates include audio features that are feature-adapted, the feature-adapted audio features being speaker independent.

18. The system of claim 13 wherein at least one layer of the two parallel layers is a command-oriented finite state (FST) recognizer layer.

19. The system of claim 13 wherein the SLM based layer is configured to utilize device information local to the user device.

20. A computer program product for performing automatic speech recognition, the computer program product comprising:
one or more non-transitory computer-readable tangible storage devices and program instructions stored on at least one of the one or more tangible storage devices, the program instructions, when loaded and executed by a processor, cause an apparatus associated with the processor to:
perform speech recognition using speech recognition result candidates received from a user device via a communications network, the speech recognition result candidates generated by the user device's performing speech recognition on one or more frames of audio data, the speech recognition performed by the user device on the one or more frames of audio data combining two parallel layers of speech recognition that utilize language models stored on the user device, wherein at least one layer of the two parallel layers is a Statistical Language Model (SLM) based layer; and
transmit to the user device, via the communications network, results of the speech recognition performed using the speech recognition result candidates.

* * * * *